(12) United States Patent
Hibino

(10) Patent No.: US 11,613,022 B2
(45) Date of Patent: Mar. 28, 2023

(54) ROBOT SYSTEM AND METHOD OF MANUFACTURING OBJECT BY USING THE ROBOT SYSTEM

(71) Applicant: KAWASAKI JUKOGYO KABUSHIKI KAISHA, Kobe (JP)

(72) Inventor: Satoru Hibino, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 261 days.

(21) Appl. No.: 16/766,362

(22) PCT Filed: Oct. 26, 2018

(86) PCT No.: PCT/JP2018/039944
§ 371 (c)(1),
(2) Date: May 22, 2020

(87) PCT Pub. No.: WO2019/102789
PCT Pub. Date: May 31, 2019

(65) Prior Publication Data
US 2020/0376677 A1    Dec. 3, 2020

(30) Foreign Application Priority Data

Nov. 22, 2017   (JP) .............................. JP2017-224267

(51) Int. Cl.
*B25J 9/16* (2006.01)
*B64U 101/30* (2023.01)
(Continued)

(52) U.S. Cl.
CPC ............. *B25J 9/1697* (2013.01); *B25J 9/042* (2013.01); *B25J 9/1666* (2013.01); *B25J 19/023* (2013.01);
(Continued)

(58) Field of Classification Search
CPC ........ B25J 9/1697; B25J 9/042; B25J 9/1666; B25J 19/023; B25J 19/04; B25J 5/00;
(Continued)

(56) References Cited

U.S. PATENT DOCUMENTS 9,855,658 B2 *  1/2018  Babu ..................... B25J 9/1674
2014/0098990 A1  4/2014  Vian et al.
(Continued)

FOREIGN PATENT DOCUMENTS

EP        3 434 092 A1    1/2019
JP        H06-15594 A     1/1994
(Continued)

*Primary Examiner* — Robert T Nguyen
(74) *Attorney, Agent, or Firm* — Oliff PLC

(57) ABSTRACT

The robot system includes a robot having a robot body and a robot controller configured to control operation of the robot body, and an unmanned aerial vehicle capable of autonomous flight. The unmanned aerial vehicle acquires at least one of image pick-up data of a work of the robot body and positional information of a work object of the robot body, and transmits at least one of the image pick-up data and the positional information to the robot controller. The robot controller receives at least one of the image pick-up data and the positional information of the work object, and controls the operation of the robot body by using at least one of the image pick-up data and the positional information of the work object.

15 Claims, 11 Drawing Sheets

(51) Int. Cl.
*B25J 9/04* (2006.01)
*B25J 19/02* (2006.01)
*B25J 19/04* (2006.01)
*B64C 39/02* (2023.01)

(52) U.S. Cl.
CPC ............ *B25J 19/04* (2013.01); *B64C 39/024* (2013.01); *B64U 2101/30* (2023.01)

(58) Field of Classification Search
CPC ...... B25J 11/0075; B25J 9/1602; B25J 9/046; B25J 9/1679; B25J 9/1694; B25J 13/06; B25J 13/08; B25J 9/1664; B64C 39/024; B64C 2201/127; B64C 2201/12; B64C 2201/145; B64C 2201/146; B64D 47/08
See application file for complete search history.

(56) References Cited

U.S. PATENT DOCUMENTS

| | | |
|---|---|---|
| 2016/0157414 A1 | 6/2016 | Ackerman et al. |
| 2016/0271796 A1 | 9/2016 | Babu |
| 2019/0022854 A1 | 1/2019 | Hackert et al. |
| 2019/0369641 A1* | 12/2019 | Gillett .................. G05D 1/0027 |
| 2023/0008259 A1* | 1/2023 | Xue .................. H04W 74/0816 |

FOREIGN PATENT DOCUMENTS

| | | |
|---|---|---|
| JP | 2002-168623 A | 6/2002 |
| JP | 2014-78232 A | 5/2014 |
| KR | 10-2011-0093501 A | 8/2011 |

\* cited by examiner

ROBOT SYSTEM AND METHOD OF MANUFACTURING OBJECT BY USING THE ROBOT SYSTEM

TECHNICAL FIELD

The present disclosure relates to a robot system, and a method of manufacturing an object by using the robot system.

BACKGROUND ART

Conventionally, in remote-control robots, it is known that a work situation of the robot is monitored by a camera. For example, in a technology disclosed in Patent Document 1, the work situation of a remote-control robot is imaged by a surveillance camera, and the image captured by the surveillance camera is displayed at a remote location. The single surveillance camera is selectively placed at a plurality of locations. Therefore, the remote-control robot can be monitored by the single surveillance camera.

REFERENCE DOCUMENT OF CONVENTIONAL ART

Patent Document

[Patent Document 1] JP1994-015594A

DESCRIPTION OF THE DISCLOSURE

Problem to be Solved by the Disclosure

Meanwhile, in recent years, the usage of the robot, i.e., objects to which the robot is applied (hereinafter, referred to as a "robot application object") have been expanded. Among these, there are robot application objects in which many work objects are located at dead angles of the surveillance camera. For example, such robot application objects include a ship, an airplane, a bridge, and a large building. Since there is a limit in increasing the installation locations of the surveillance camera with the conventional technology in the case of such a robot application object, it is difficult to address the problem. In addition, since there are many work objects in such a robot application object, it is necessary to move the robot to near each work object. In such a case, at least the positional information of the work objects is required. The conventional technology does not refer to the positional information of the work objects at all.

The present disclosure is made in view of solving the problem, and is to provide a robot system and a method of manufacturing an object by using the robot system, which are capable of addressing at least one of a robot application object in which there are many work objects located at dead angles of a surveillance camera and a robot application object in which it is necessary to move a robot to near each work object.

SUMMARY OF THE DISCLOSURE

In order to solve the problem described above, a robot system according to one aspect of the present disclosure includes a robot having a robot body and a robot controller configured to control operation of the robot body, and an unmanned aerial vehicle capable of autonomous flight. The unmanned aerial vehicle acquires at least one of image pick-up data of a work of the robot body and positional information of a work object of the robot body, and transmits at least one of the image pick-up data and the positional information to the robot controller. The robot controller receives at least one of the image pick-up data and the positional information of the work object, and controls the operation of the robot body by using at least one of the image pick-up data and the positional information of the work object.

According to this configuration, when the unmanned aerial vehicle acquires at least one of the image pick-up data of the work of the robot body and the positional information of the work object of the robot body and transmits it to the robot controller, and when the robot controller controls the operation of the robot body using this image pick-up data, for example, by the robot system being configured so that the robot controller displays the image of the work of the robot body to a display unit based on the image pick-up data, and the operator controls the operation of the robot body by the robot operation terminal through the robot controller, the operator can operate the robot body while watching the image of the work of the robot body displayed on the display unit by moving the unmanned aerial vehicle to the position suitable for imaging the work object of a robot application object. On the other hand, when the unmanned aerial vehicle acquires the positional information of the work object of the robot body and transmits it to the robot controller, and when the robot controller controls the operation of the robot body using this positional information, by the robot body being configured to be movable, the robot controller can move the robot body to a work position of the robot body by using the positional information of the work object of the robot body. As a result, it becomes possible to address at least one of a robot application object in which there are many work objects located at dead angles of a surveillance camera, and a robot application object in which it is necessary to move the robot to near each work object.

The robot system may further include a robot operation terminal for an operator to operate the robot body, and a display unit configured to present the operator an image of the work of the robot body. The unmanned aerial vehicle may acquire the image pick-up data of the work of the robot body, and transmit the image pick-up data to the robot controller. The robot controller may receive the image pick-up data, display the image of the work of the robot body on the display unit based on the image pick-up data, and control the operation of the robot body according to the operation of the robot operation terminal by the operator.

According to this configuration, the operator can operate the robot body while watching the image of the work of the robot body displayed on the display unit by moving the unmanned aerial vehicle to the position suitable for imaging the work object of the robot application object. Therefore, it becomes possible to suitably address the robot application object in which there are many work objects located at dead angles of the surveillance camera.

The unmanned aerial vehicle may include an imaging apparatus configured to image the work of the robot body and an aerial vehicle communication apparatus configured to transmit the image pick-up data from the imaging apparatus to the robot controller. The robot may include a robot communication apparatus configured to receive the image pick-up data transmitted from the aerial vehicle communication apparatus.

According to this configuration, the robot system can suitably be established, in which the operator can operate the robot body while watching the image of the work of the robot body displayed on the display unit.

The robot system may further include a moving device to which the robot body is attached, and a moving device operation terminal for the operator to operate the moving device. The moving device may move the robot body in a vertical direction and a horizontal direction.

According to this configuration, the operator can move the robot body in the vertical direction and the horizontal direction by operating the moving device operation terminal. As a result, the operation of the robot body can be performed suitably.

The robot body may be travelable. The robot operation terminal may be operable of the work and traveling of the robot body, and the robot controller may control the traveling of the robot body according to the operation by the operator of the robot operation terminal related to the traveling of the robot body.

According to this configuration, the operator can cause the robot body to travel to a work object position while watching the positional information of the work object of the robot body displayed on the display unit.

The robot controller may control the operation of the robot body according to a given control program.

According to this configuration, the robot body can be operated automatically.

The robot controller may identify the work object of the robot body by using the unmanned aerial vehicle.

According to this configuration, since a wide range can be monitored by using the unmanned aerial vehicle, the work object of the robot body can easily be identified.

The robot body may be travelable. The unmanned aerial vehicle may acquire the positional information of the work object of the robot body, and transmit the positional information to the robot controller. When the positional information of the work object is received, the robot controller may cause the robot body to travel to the work object position based on the position of the robot body and the positional information of the work object.

According to this configuration, the robot body can be caused to travel automatically to the work object position.

The unmanned aerial vehicle may acquire the positional information of the robot body, and transmit the positional information to the robot controller. The robot controller may cause the robot body to travel to the work object position based on the received position of the robot body and the positional information of the work object.

According to this configuration, the positional information of the robot body can be acquired automatically, and the robot body can be caused to travel to the work object position automatically.

The unmanned aerial vehicle may further acquire positional information of an obstacle existing in a course from the robot body to the work object, and transmit the positional information to the robot controller. The robot controller may cause the robot body to travel to the work object position while avoiding the obstacle, based on the received positional information of the obstacle.

According to this configuration, the robot body can be caused to travel to the work object position while avoiding the obstacle existing in the course from the robot body to the work object.

The robot body may be an industrial articulated robotic arm.

According to this configuration, since the robot body is the industrial articulated robotic arm, the application object and the work object are versatile. Therefore, the robot system can be provided for the robotic arm which can suitably address at least one of the robot application object in which there are many work objects located at dead angles of the surveillance camera, and the robot application object in which it is necessary to move the robot to near each work object.

Another aspect of the present disclosure provides a method of manufacturing an object by using a robot system including a robot having a robot body and a robot controller configured to control operation of the robot body, and an unmanned aerial vehicle capable of autonomous flight. The method includes acquiring image pick-up data of a work of the robot body to the object and transmitting the image pick-up data to the robot controller, by the unmanned aerial vehicle, and receiving the image pick-up data and controlling the operation of the robot body by using the image pick-up data, by the robot controller.

According to this configuration, for example, by the robot system being configured so that the robot controller displays the image of the work of the robot body to a display unit based on the image pick-up data, and the operator controls the operation of the robot body by the robot operation terminal through the robot controller, the operator can operate the robot body while watching the image in which the work of the robot body is displayed by moving the unmanned aerial vehicle to the position suitable for imaging the work object of a robot application object.

The robot system may further include a robot operation terminal for an operator to operate the robot body, a display unit configured to present the operator an image of the work of the robot body, and an aerial vehicle operation terminal for the operator to operate the unmanned aerial vehicle. The acquiring the image pick-up data of the work of the robot body to the object and transmitting the image pick-up data to the robot controller may be performed according to the operation of the aerial vehicle operation terminal by the operator. The receiving the image pick-up data and controlling the operation of the robot body by using the image pick-up data, by the robot controller, may be displaying an image of the work of the robot body to the object on the display unit based on the image pick-up data, and controlling the operation of the robot body according to the operation of the robot operation terminal by the operator, by the robot controller.

According to this configuration, the operator can cause the robot body to travel to the work object position while watching the positional information of the work object of the robot body displayed on the display unit.

The robot body may be an industrial articulated robotic arm, and the object may be any of a ship, a vehicle, an airplane, a bridge, and a building.

According to this configuration, since the robot body is the industrial articulated robotic arm, the application object and the work object are versatile. In addition, the ship, the vehicle, the airplane, the bridge, and the building are the robot application objects in which there are many work objects located at dead angles of the surveillance camera, or the robot application objects in which it is necessary to move the robot to near each work object. Therefore, the robot system has especially remarkable effects for these robot application objects.

Effect of the Disclosure

According to the present disclosure, the robot system and the method of manufacturing the object by using the robot system can be provided, which can address at least one of the robot application object in which there are many work objects located at the dead angles of the surveillance camera, and the robot application object in which it is necessary to move the robot to near each work object.

MODES FOR CARRYING OUT THE DISCLOSURE

Figure 1:
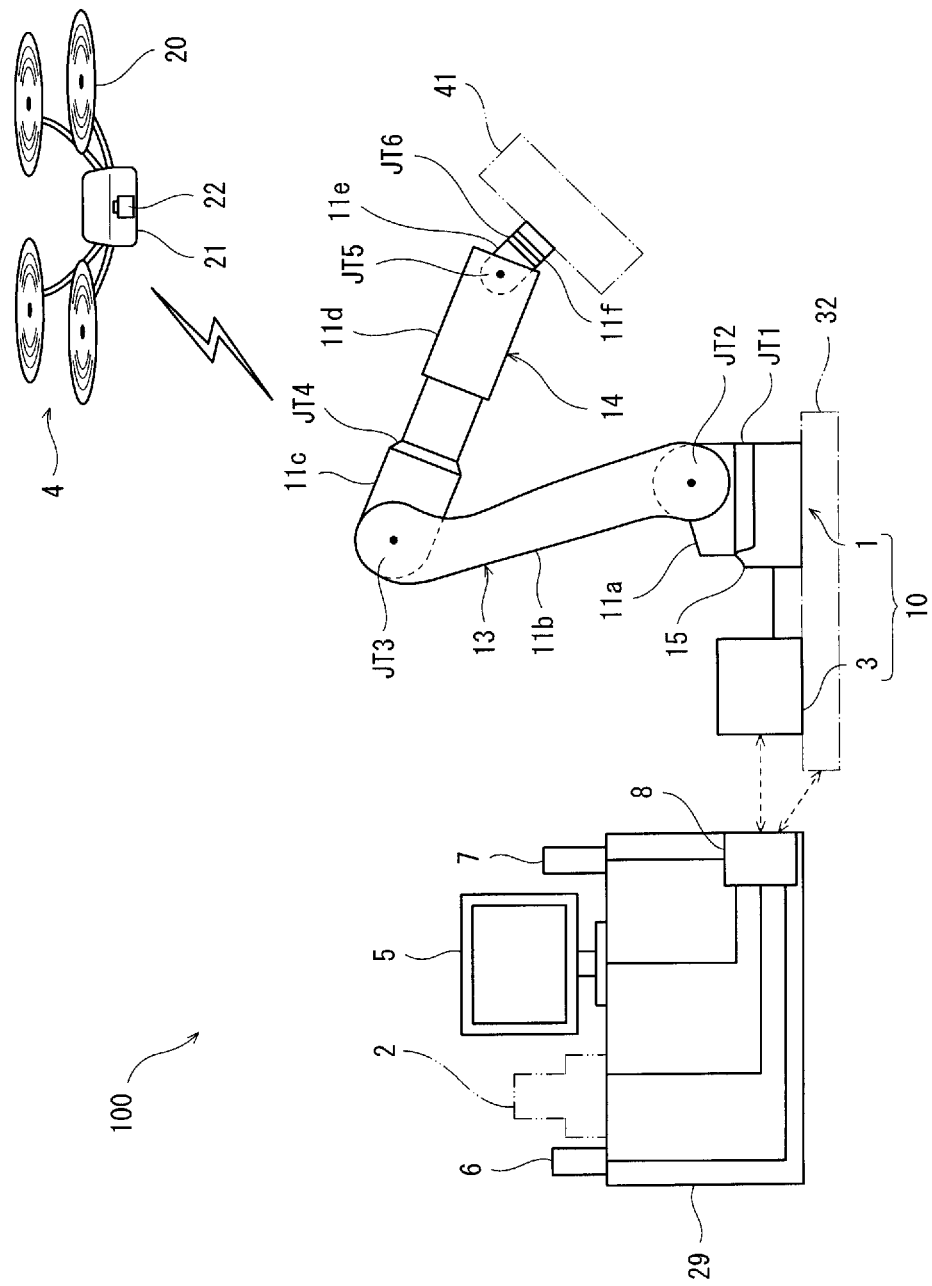
FIG. 1 is a schematic diagram illustrating one example of a configuration of hardware of a robot system according to Embodiment 1 of the present disclosure.

Hereinafter, embodiments of the present disclosure will be described with reference to the accompanying drawings. Note that, below, throughout the figures, the same reference characters are assigned to the same or corresponding elements to omit redundant description. Moreover, the accompanying drawings are drawings for illustrating the present disclosure. Therefore, an element unrelated to the present disclosure may be omitted, the scale may not be exact for exaggeration, the drawings may be simplified, and the shape of the same element may be different in a plurality of drawings.

Embodiment 1

[Configuration of Hardware]

Figure 2:
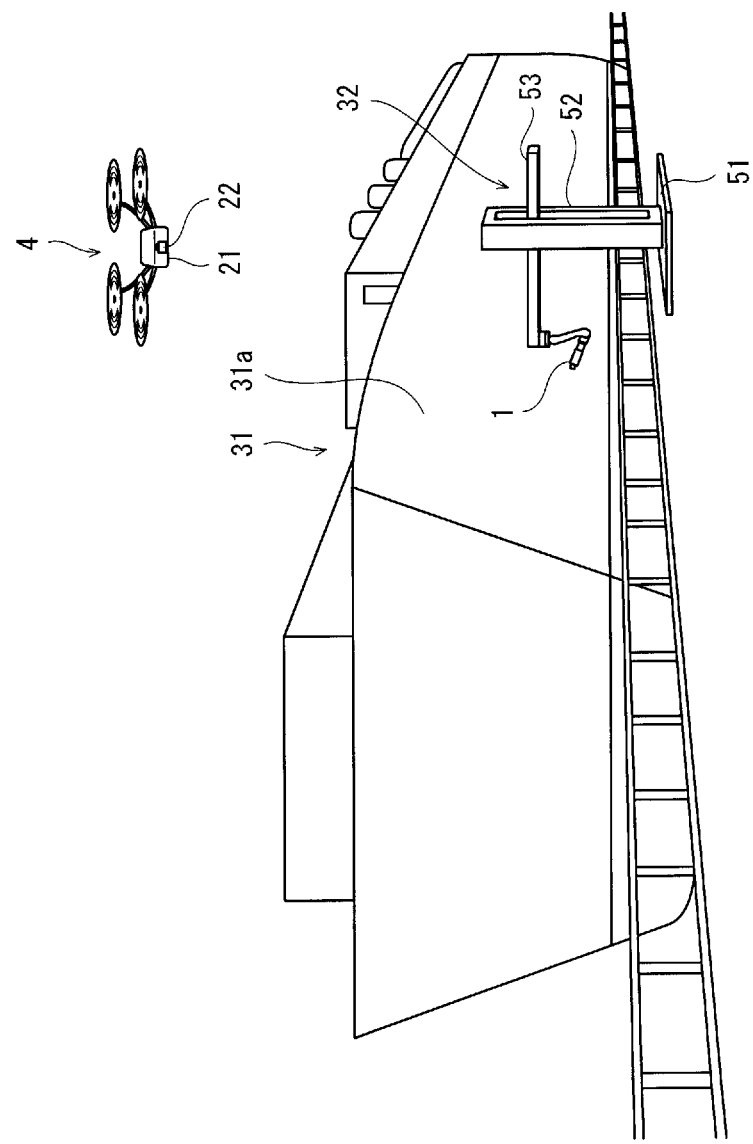
FIG. 2 is a schematic diagram illustrating an applied state of the robot system of FIG. 1.

FIG. 1 is a schematic diagram illustrating one example of a configuration of a robot system according to Embodiment 1 of the present disclosure. FIG. 2 is a schematic diagram illustrating an applied state of the robot system of FIG. 1.

Referring to FIG. 1, a robot system 100 includes a robot 10 having a robot body 1 and a robot controller 3 which controls operation of the robot body 1, and an unmanned aerial vehicle (a.k.a. UAV or drone) 4 which is capable of autonomous flight. The unmanned aerial vehicle 4 acquires an image pick-up data of a work of the robot body 1 and transmits it to the robot controller 3. The robot controller 3 receives the image pick-up data and controls operation of the robot body 1 by utilizing the image pick-up data.

Here, the robot system 100 further includes a robot operation terminal 2 for an operator 9 (not illustrated in FIG. 1, see FIG. 5) to manipulate the robot body 1, and a monitor (display unit) 5 for presenting the image of the work of the robot body 1 to the operator 9. The unmanned aerial vehicle 4 acquires the image pick-up data of the work of the robot body 1 and transmits it to the robot controller 3. The robot controller 3 receives the image pick-up data, displays the image of the work of the robot body 1 on the display unit 5 based on the image pick-up data, and controls the operation of the robot body 1 according to an operation of the robot operation terminal 2 by the operator 9.

Below, a configuration of the robot system 100 is described concretely. The robot system 100 includes the robot 10, a moving device 32 which moves the robot 10, the unmanned aerial vehicle 4, the robot operation terminal 2, the monitor (display unit) 5, an aerial vehicle operation terminal 6, a moving device operation terminal 7, and an operation communication apparatus 8.

<Robot>

The robot 10 includes the robot body 1 and the robot controller 3. Here, the robot body 1 is comprised of an industrial articulated robotic arm.

{Robot Body}

The robot body 1 includes a pedestal 15, an arm part 13 supported by the pedestal 15, a wrist part 14 supported by a tip end of the arm part 13, and a hand 41 as an end effector attached to the wrist part 14. Here, the hand 41 is comprised of a paint gun.

As illustrated in FIG. 1, the robot body 1 is an articulated robotic arm having a plurality of, three or more joints JT1-JT6, and is comprised of a plurality of serially-coupled links 11a-11f. In more detail, at the first joint JT1, the pedestal 15 and a base-end part of the first link 11a are coupled to each other rotatably on an axis extending in the vertical direction. At the second joint JT2, a tip-end part of the first link 11a and a base-end part of the second link 11b are coupled to each other rotatably on an axis extending in the horizontal direction. At the third joint JT3, a tip-end part of the second link 11b and a base-end part of the third link 11c are coupled to each other rotatably on an axis extending in the horizontal direction. At the fourth joint JT4, a tip-end part of the third link 11c and a base-end part of the fourth link 11d are coupled to each other rotatably on an axis extending in the longitudinal direction of the fourth link 11d. At the fifth joint JT5, a tip-end part of the fourth link 11d and a base-end part of the fifth link 11e are coupled to each other rotatably on an axis perpendicular to the longitudinal direction of the link 11d. At the sixth joint JT6, a tip-end part of the fifth link 11e and a base-end part of the sixth link 11f are rotatably coupled to each other in a twisted fashion. A mechanical interface is provided to a tip-end part of the sixth link 11f. The hand 41 as the end effector corresponding to the type of the work of a robotic arm 11 is detachably attached to the mechanical interface.

The arm part 13 of the robotic arm 11 is formed by a coupled body comprised of the links and joints, such as the first joint JT1, the first link 11a, the second joint JT2, the second link 11b, the third joint JT3, and the third link 11c described above. Moreover, the wrist part 14 of the robotic arm 11 is formed by a coupled body comprised of the links and joints, such as the fourth joint JT4, the fourth link 11d, the fifth joint JT5, the fifth link 11e, the sixth joint JT6, and the sixth link 11f described above.

The joints JT1-JT6 are each provided with a drive motor (not illustrated) as one example of an actuator which relatively rotates two members coupled through the joint. For example, the drive motor is a servomotor which is servo-controlled through a servo amplifier by a control signal transmitted from the robot controller 3. Moreover, the joints JT1-JT6 are each provided with a rotation angle sensor (not illustrated) for detecting a rotation angle of the drive motor, and a current sensor (not illustrated) for detecting current of the drive motor.

{Controller}

For example, the controller 3 includes a processor and a memory. The controller 3 controls operation of the robot body 1 by the processor reading and executing a given operation program stored in the memory. In detail, for example, the controller 3 is comprised of a microcontroller, an MPU, an FPGA (Field Programmable Gate Array), a PLC (Programmable Logic Controller), or a logic circuit. The controller 3 generates a control signal for the arm part 13 and the wrist part 14 of the robot body 1 by using a detection signal of the rotation angle sensor and a detection signal of the current sensor as a feedback signal, and carries out a feedback control of the operations of the arm part 13 and the wrist part 14. Further, the robot controller 3 controls the operation of the hand 41 of the robot body 1 according to the given operation program.

<Moving Device>

The robot 10 is attached to the moving device 32. The moving device 32 is capable of moving the robot body 1 in the vertical direction and the horizontal direction.

Referring to FIG. 2, for example, the moving device 32 has a pedestal 51 installed on an installation surface. A support 52 is provided so as to stand from the pedestal 51. The support 52 is provided with a movable body 53 so as to be movable in the vertical direction and the horizontal direction by an actuator mechanism 54 (not illustrated in FIG. 2, see FIG. 3). For example, the actuator mechanism 54 is comprised of a well-known 2-axis actuator mechanism. For example, the movable body 53 is comprised of a horizontal bar-shaped frame object. The robot body 1 is installed at one end of the movable body 53.

<Unmanned Aerial Vehicle>

Referring to FIG. 1, for example, the unmanned aerial vehicle 4 is comprised of a drone. For example, the unmanned aerial vehicle 4 includes a main body 21 and four rotors 20 provided to the main body 21. A camera 22 is provided to the main body 21. The unmanned aerial vehicle 4 has a manipulating mode and an autonomous flight mode. The unmanned aerial vehicle 4 flies autonomously in a state where an operational instruction is not received from the aerial vehicle operation terminal 6, and when the aerial vehicle operational instruction is received from the aerial vehicle operation terminal 6, the mode is changed to the manipulating mode in which it flies according to the aerial vehicle operational instruction. The camera 22 is changeable of its posture in two planes perpendicular to each other, and has an automatic-focusing function. The camera 22 is used for imaging the work of the robot 10.

<Operation Terminal Group>

An operation desk 29 is disposed in the robot system 100. The operation desk 29 is disposed at a location distant from an application target of the robot 10. The robot operation terminal 2, the monitor (display unit) 5, the aerial vehicle operation terminal 6, and the moving device operation terminal 7 are disposed on the operation desk 29. Moreover, the operation communication apparatus 8 is provided to the operation desk 29. The robot operation terminal 2 is comprised of a joystick or a master robot, and outputs a robot operational instruction according to the operation of the terminal. The aerial vehicle operation terminal 6 is provided with an aerial vehicle interface and a camera interface. The aerial vehicle interface is comprised of a joystick or a control lever, and outputs an aerial vehicle operational instruction according to the operation of the interface. The camera interface is comprised of a suitable operation mechanism, such as a push button and/or a dial, and outputs a camera operational instruction according to the operation of the interface. The moving device operation terminal 7 is comprised of a joystick, and outputs a move instruction according to the operation of the terminal.

[Application Environment]

Referring to FIG. 2, in Embodiment 1, the robot 10 is applied to rigging of a ship 31, for example. In other words, in Embodiment 1, the application object of the robot 10 is the ship 31, the work of the robot 10 (robot body 1) is rigging, and the work object of the robot 10 (robot body 1) is a rigging part of the ship 31.

Since this ship 31 is large, dead angles tend to be generated for a fixed surveillance camera. Moreover, many working parts of the robot 10 exist. Thus, when the robot system 100 of Embodiment 1 is applied to the ship 31, especially prominent effects can be acquired.

In the example of FIG. 2, the robot body 1 paints a side surface 31a of the hull of the ship 31 by using a paint gun as the hand 41 provided at a tip-end part thereof. Moreover, the unmanned aerial vehicle 4 images the work of the robot body 1 by using the camera 22.

[Configuration of Control System]

Figure 3:
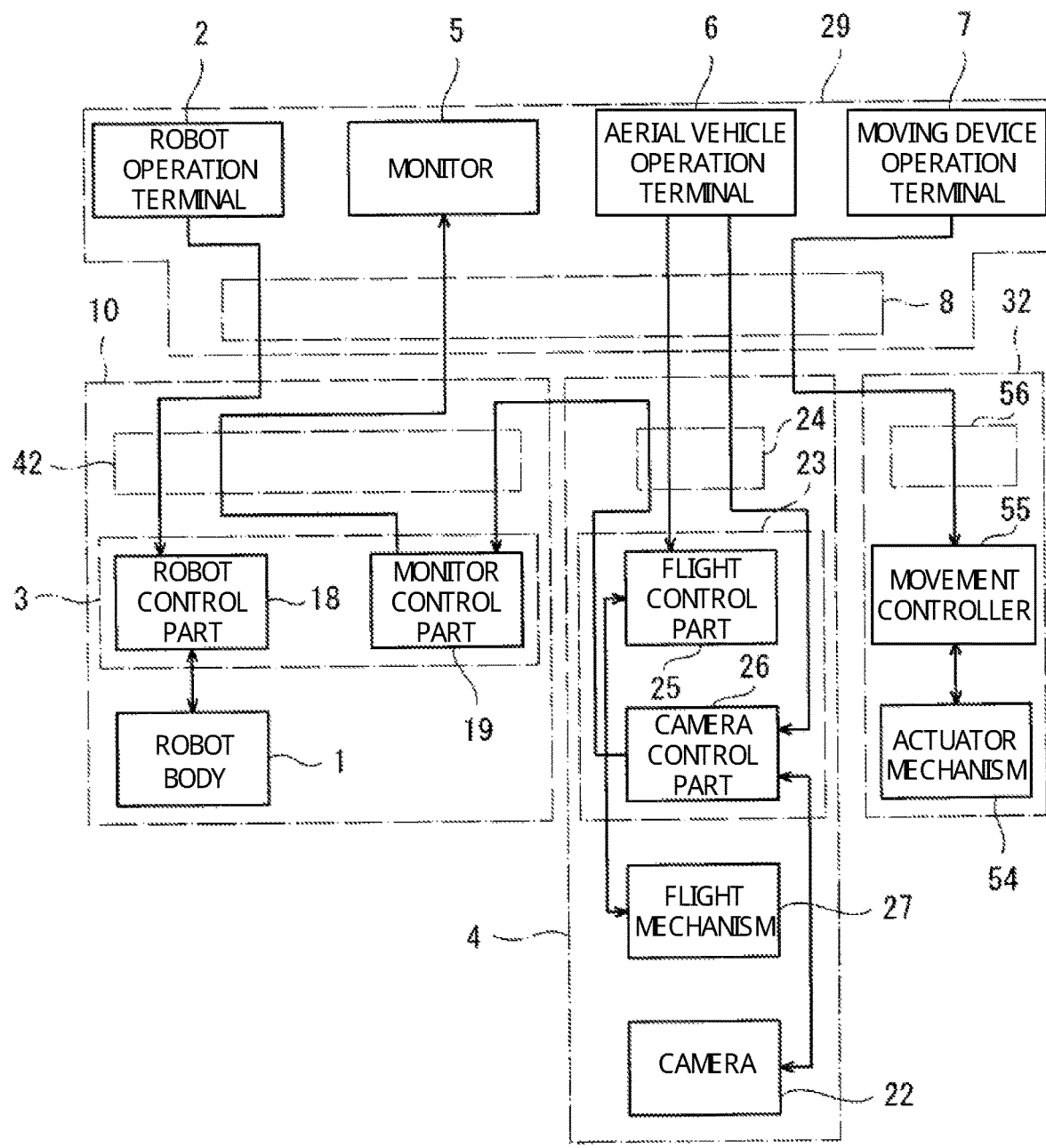
FIG. 3 is a block diagram illustrating one example of a configuration of a control system of the robot system of FIG. 1.

FIG. 3 is a block diagram illustrating one example of a configuration of a control system of the robot system of FIG. 1. Referring to FIG. 3, the operation desk 29 includes the robot operation terminal 2, the monitor 5, the aerial vehicle operation terminal 6, the moving device operation terminal 7, and the operation communication apparatus 8. The operation communication apparatus 8 transmits instructions transmitted from the robot operation terminal 2, the aerial vehicle operation terminal 6, and the moving device operation terminal 7 to a robot communication apparatus 42 or an aerial vehicle communication apparatus 24. Moreover, the operation communication apparatus 8 transmits a display control signal received from the robot communication apparatus 42 to the monitor 5. The monitor 5 displays the image according to the received display control signal.

The robot 10 includes the robot controller 3, the robot body 1, and the robot communication apparatus 42. The robot communication apparatus 42 transmits a display control signal transmitted from the robot controller 3 to the operation communication apparatus 8, and transmits a robot operational instruction and the image pick-up data received from the operation communication apparatus 8 and the aerial vehicle communication apparatus 24 to the robot controller 3. The robot controller 3 includes a robot control part 18 and a monitor control part 19. The robot control part 18 controls the operation of the robot body 1 according to the robot operational instruction from the robot operation terminal 2 received through the robot communication apparatus 42. The monitor control part 19 transmits a display control signal to the monitor 5 through the robot communication apparatus 42, and displays an image according to the display control signal on the monitor 5. Particularly, the monitor control part 19 receives the image pick-up data from a camera control part 26 through the robot communication apparatus 42, and displays the image according to the image pick-up data on the monitor 5.

The unmanned aerial vehicle 4 includes an aerial vehicle controller 23, a flight mechanism 27, the camera 22, and the aerial vehicle communication apparatus 24. The flight mechanism 27 is a mechanism for flying the unmanned aerial vehicle 4 toward a desired direction, and includes a drive source and an angle adjustment mechanism of the rotors 20. The aerial vehicle communication apparatus 24 transmits the image pick-up data transmitted from the aerial vehicle controller 23 to the robot communication apparatus 42, and transmits the operational instruction received from the aerial vehicle operation terminal 6 to the aerial vehicle controller 23. The aerial vehicle controller 23 includes a flight control part 25 and the camera control part 26. The flight control part 25 controls the flight mechanism 27 in the autonomous mode so that the unmanned aerial vehicle 4 performs a given flight according to a given program. Moreover, when the aerial vehicle operational instruction from the aerial vehicle operation terminal 6 is received through the aerial vehicle communication apparatus 24, the flight control part 25 controls the flight mechanism 27 according to the aerial vehicle operational instruction so that the unmanned aerial vehicle 4 performs the flight according to the aerial vehicle operational instruction. When the camera operational instruction is received from the aerial vehicle operation terminal 6 through the aerial vehicle communication apparatus 24, the camera control part 26 controls operation of the camera 22 (ON/OFF and posture) according to the camera operational instruction. Moreover, the camera control part 26 transmits the image pick-up data imaged by the camera 22 to the aerial vehicle communication apparatus 24.

The moving device 32 includes a movement controller 55, the actuator mechanism 54, and a moving device communication apparatus 56. The moving device communication apparatus 56 transmits the move instruction received from the operation communication apparatus 8 to the movement controller 55. Referring to FIG. 2, the movement controller 55 controls the actuator mechanism 54 so that the movable body 53 moves according to the move instruction.

Here, although the communications between the operation communication apparatus 8, and the robot communication apparatus 42, the aerial vehicle communication apparatus 24, and the moving device communication apparatus 56, and the communications between the robot communication apparatus 42 and the aerial vehicle communication apparatus 24 are performed wirelessly, they may be performed wiredly.

[Operation]

Next, operation (how to use) of the robot system 100 configured as described above is described. In other words, the operation (how to use) of the robot system 100 is a method of manufacturing an object by using the robot system 100. Here, as illustrated in FIG. 2, a case where the robot body 1 paints the hull of the ship 31 is described as one example.

Figure 4:
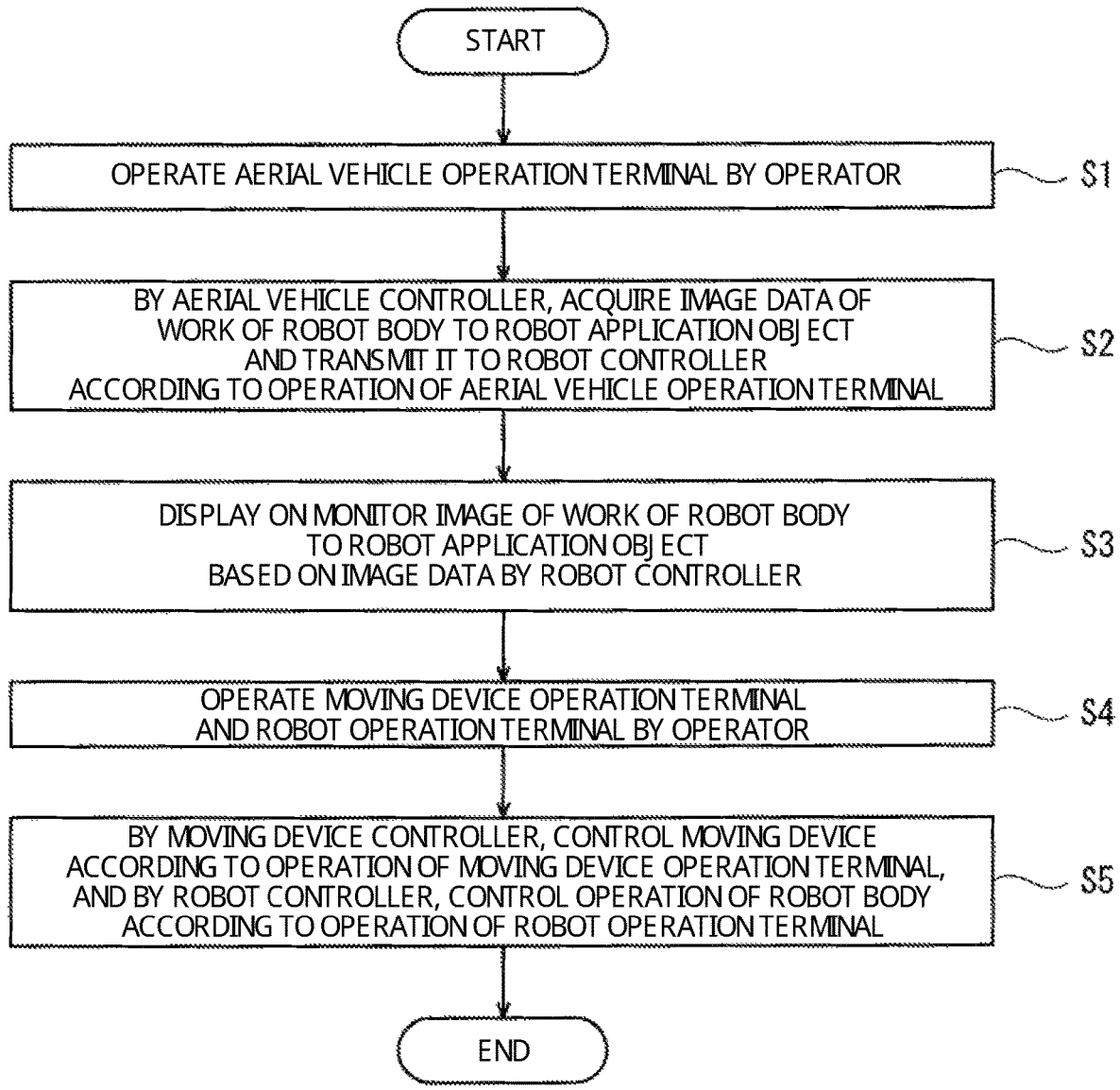
FIG. 4 is a flowchart illustrating a method of using the robot system of FIG. 1.

FIG. 4 is a flowchart illustrating a method of using the robot system 100 of FIG. 1.

<Preparation>

Referring to FIGS. 1 to 4, the operator 9 first operates the aerial vehicle interface of the aerial vehicle operation terminal 6 while directly watching the unmanned aerial vehicle 4 so that the unmanned aerial vehicle 4 flies to a desired position (Step S1).

Then, the flight control part 25 of the aerial vehicle controller 23 controls the flight mechanism 27 to fly the unmanned aerial vehicle 4 according to the operation of the aerial vehicle interface. The operator 9 releases a hand from the aerial vehicle interface when the unmanned aerial vehicle 4 is located at the desired position. Then, the unmanned aerial vehicle 4 shifts to the autonomous mode, where it flies so that it hovers or stops at the position. On the other hand, in the meantime, the image pick-up data imaged by the camera of the unmanned aerial vehicle 4 is transmitted to the monitor control part 19 of the robot controller 3 from the camera control part 26 of the aerial vehicle controller 23, and the image corresponding to the image pick-up data is displayed on the monitor 5 by the monitor control part 19. The operator 9 operates the camera interface of the aerial vehicle operation terminal 6 so that the work object of the robot body 1 (a desired paint part of the side surface 31a of the hull of the ship 31) is displayed on the monitor 5, while watching the monitor 5. Then, the camera control part 26 of the aerial vehicle controller 23 changes the posture of the camera 22 according to this operation, and, thereby, the work object of the robot body 1 (paint part) is displayed on the monitor 5.

<Main Work>

Then, the operator 9 operates the moving device operation terminal 7 so that the robot body 1 approaches the work object of the robot body 1, while watching the monitor 5. Then, the movement controller 55 of moving device 32 controls the actuator mechanism 54 to bring the robot body 1 close to the work object of the robot body 1. Then, the operator 9 operates the robot operation terminal 2 to start painting of the desired paint part of the side surface 31a of the hull of the ship 31 by using the paint gun of the robot body 1. On the other hand, the camera 22 of the unmanned aerial vehicle 4 images this paint work, and transmits the image pick-up data to the camera control part 26. The camera control part 26 transmits this image pick-up data to the monitor control part 19 of the robot controller 3 (Step S2).

The monitor control part 19 (robot controller 3) displays on the monitor 5 the image of the imaged paint work which is an image corresponding to the image pick-up data (Step S3). The operator 9 paints by operating the robot operation terminal 2, while watching the image of the paint work displayed on this monitor 5. Then, when the paint of the paint part is finished, the operator 9 operates the moving device operation terminal 7 so that the robot body 1 moves to the next work object (the next paint part of the side surface 31a of the hull of the ship 31). Then, the movement controller 55 of moving device 32 controls the actuator mechanism 54 to bring the robot body 1 close to the next work object of the robot body 1. Then, the operator 9 operates the robot operation terminal 2 while watching the image of the monitor 5 to paint the next work object (the next paint part of the side surface 31a of the hull of the ship 31) by using the paint gun of the robot body 1 (Step S4).

Thereafter, Steps S2 to S4 are repeated, and when the scheduled paint work is finished, the paint of the hull of the ship 31 is ended.

[Operation and Effects]

As described above, according to Embodiment 1, since the unmanned aerial vehicle 4 acquires the image pick-up data of the work of the robot body 1, transmits the image pick-up data to the robot controller 3, the robot controller 3 displays the image of the work of the robot body 1 to the display unit (monitor 5) based on the image pick-up data, and the operator 9 controls the operation of the robot body 1 by the robot operation terminal 2 through the robot controller 3, the operator 9 can operate the robot body 1 while watching the image of the work of the robot body 1 displayed on the display unit (monitor 5) by moving the unmanned aerial vehicle 4 to the position suitable for imaging the work object (the paint part of the side surface 31a of the hull) of the robot application object (ship 31). Therefore, Embodiment 1 can suitably address the robot application object (ship) in which there are many work objects (the paint parts of the side surface 31a of the hull) which become dead angles of a fixed surveillance camera.

Moreover, since the robot system 100 further includes the moving device 32 to which the robot body 1 is attached, and the moving device operation terminal 7 for the operator 9 to operate the moving device 32, and the moving device 32 is configured to be movable of the robot body 1 in the vertical direction and the horizontal direction, the robot body 1 can be moved in the vertical direction and the horizontal direction by the operator 9 operating the moving device operation terminal 7. As a result, the robot body 1 can suitably perform the work.

Modification of Embodiment 1

Figure 5:
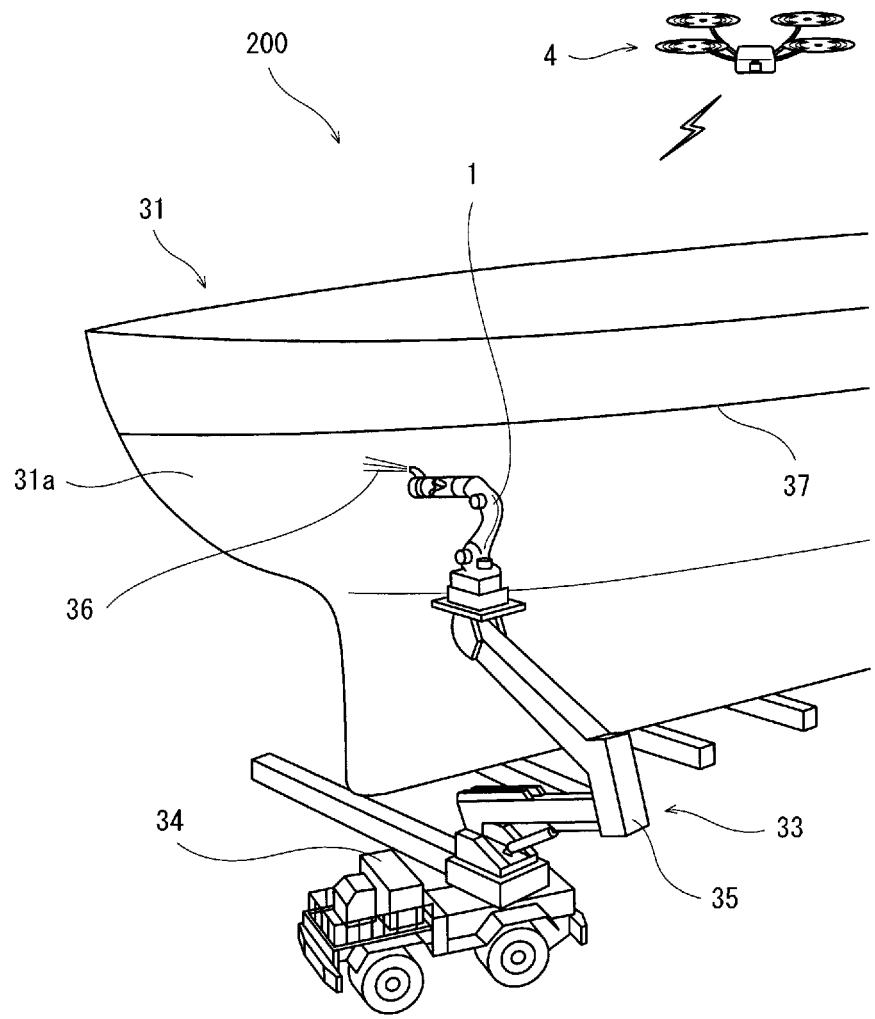
FIG. 5 is a schematic diagram illustrating an applied state of a robot system according to a modification of Embodiment 1 of the present disclosure.
Figure 6:
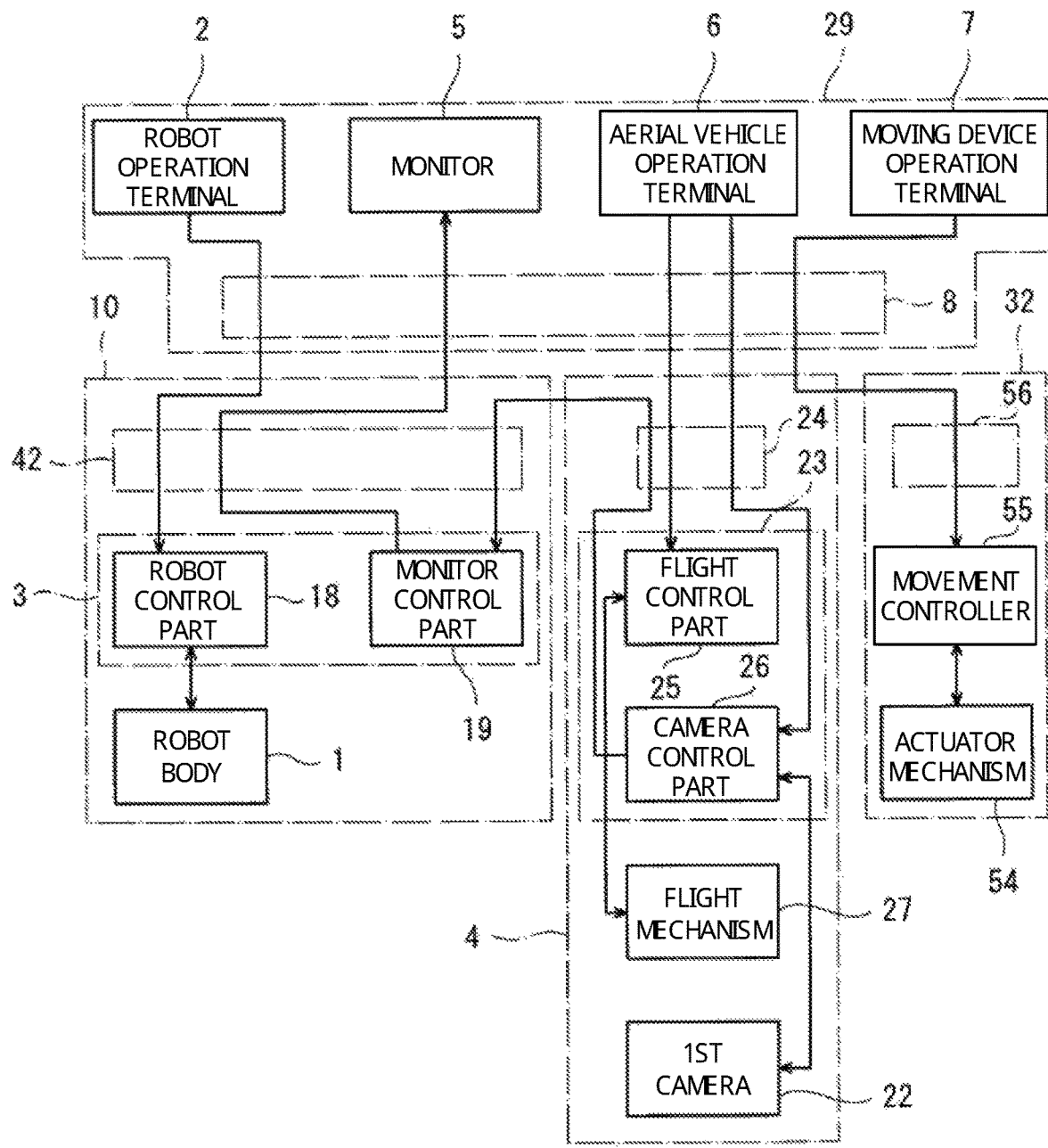
FIG. 6 is a block diagram illustrating one example of a configuration of a control system of the robot system illustrated in FIG. 5.

FIG. 5 is a schematic diagram illustrating an applied state of the robot system according to a modification of Embodiment 1 of the present disclosure. FIG. 6 is a block diagram illustrating one example of a configuration of a control system of the robot system illustrated in FIG. 5.

As illustrated in FIG. 5, unlike the robot system 100 of Embodiment 1 (basic configuration), a robot system 200 of the modification of Embodiment 1 is different in that a moving device 33 is configured to be travelable, and the other configuration is the same as that of the robot system 100 of Embodiment 1. Below, this difference is described.

Referring to FIG. 5, for example, the moving device 33 is comprised of a well-known crane truck. The moving device 33 includes a vehicle 34, and a refraction-type jib (boom) 35 provided to a loading platform part of the vehicle 34. The robot body 1 comprised of the industrial articulated robotic arm is installed in a tip-end part of the jib 35. A ship 31 is larger than the ship 31 of Embodiment 1. Thus, when painting the side surface 31a of the hull of the ship 31 by the robot body 1, it is necessary to widely move the robot body 1. Note that the reference character 36 indicates sprayed paint, and the reference character 37 indicates a boundary line of painting in different colors on the side surface 31a of the hull of the ship 31.

In this modification, the moving device operation terminal 7 is configured so that the operator 9 is possible to travel the moving device 33 toward a desired direction at a desired speed, to rotate the refraction-type jib 35 toward a desired direction, and to bend and stretch the refraction-type jib 35 to a desired extent.

In this modification, the operator 9 can move the robot body 1 to a desired position by suitably operating the moving device 33. In detail, by operating the aerial vehicle operation terminal 6, the operator 9 remotely controls the unmanned aerial vehicle 4 and the camera 22 so that the ship 31 which is the application object of the robot body 1 and the moving device 33 are simultaneously displayed on the monitor 5. Then, the operator 9 operates the moving device operation terminal 7 while watching the ship 31 and the moving device 33 which are displayed on the monitor 5 to cause the vehicle 34 of the moving device 33 to travel and bend and stretch the jib 35 so that the robot body 1 approaches a desired paint part of the side surface 31a of the hull of the ship 31. In this way, in this modification, the operator 9 can move the robot body 1 in the wide range. As a result, even if the ship 31 is large, the side surface 31a of the hull of the ship 31 can be painted suitably.

Embodiment 2

A robot system 300 of Embodiment 2 of the present disclosure is mainly different from the robot system 100 of Embodiment 1 in that the robot body 1 and the unmanned aerial vehicle 4 operate according to respective programs. Below, the difference from the robot system 100 of Embodiment 1 is described.

[Configuration]

Figure 7:
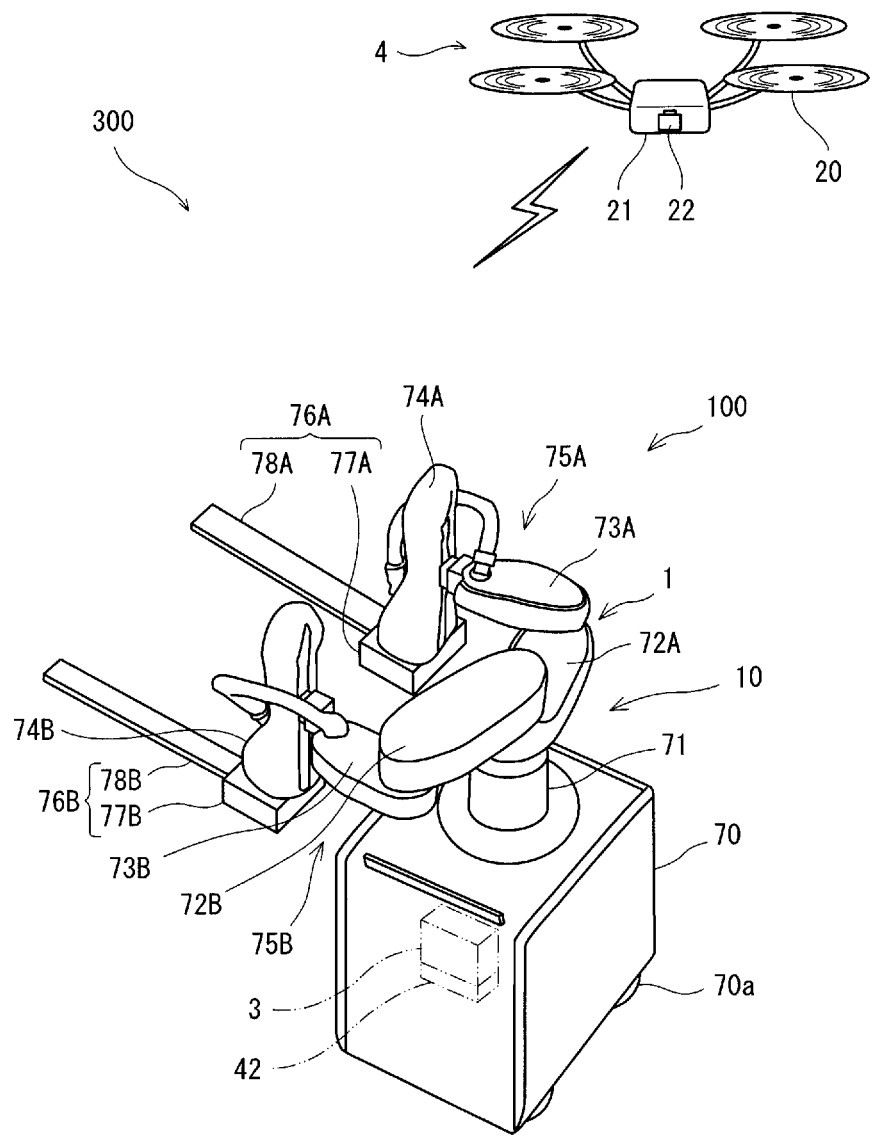
FIG. 7 is a schematic diagram illustrating one example of a configuration of hardware of a robot system according to Embodiment 2 of the present disclosure.

FIG. 7 is a schematic diagram illustrating one example of a configuration of hardware of the robot system according to Embodiment 2 of the present disclosure.

Referring to FIG. 7, the robot system 300 is provided with a carriage 70. Here, the carriage 70 is comprised of a box body provided with wheels 70a in a base part. The carriage 70 is movable by the wheels 70a, and it can be stopped at a desired location. The wheels 70a are driven by a drive mechanism (not illustrated). For example, this drive mechanism is provided with a servomotor as its drive source. The wheels 70a and the drive mechanism constitute the actuator mechanism 54 (see FIG. 8).

A robotic arm as the robot body 1 is installed in an upper surface of the carriage 70. The robotic arm performs a given work described later. Therefore, the robotic arm may be any type as long as it has an arm and is capable of performing the given work. For example, the robotic arm may include a horizontally articulated robot, a vertically articulated robot, a parallel link robot, and an orthogonal robot. Here, the robotic arm is a dual-arm horizontally articulated robot.

The robotic arm is installed in the upper surface of the carriage 70, and includes a cylindrical base 71 extending in the vertical direction, and a right arm and a left arm which are supported by the base 71. The right arm includes a first right link 72A of which a base-end part is supported by the base 71 rotatably on a first rotation axis which is the center axis of the base 71, a second right link 73A of which a base-end part is supported by a tip-end part of the first right link 72A rotatably on a second rotation axis parallel to the first rotation axis, a right wrist part 74A which is supported by a tip-end part of the second right link 73A elevatably and rotatably in a twisted fashion on a third rotation axis perpendicular to the second rotation axis, and a right hand 76A attached to a lower end of the right wrist part 74A. The first right link 72A, the second right link 73A, and the right wrist part 74A constitute a right arm part 75A.

The left arm includes a first left link 72B of which a base-end part is supported by the base 71 rotatably on the first rotation axis which is the center axis of the base 71, a second left link 73B of which a base-end part is supported by a tip-end part of the first left link 72B rotatably on a fourth rotation axis parallel to the first rotation axis, a left wrist part 74B which is supported by a tip-end part of the second left link 73B elevatably and rotatably in a twisted fashion on a fifth rotation axis perpendicular to the fourth rotation axis, and a left hand 76B attached to a lower end of the left wrist part 74B. The first left link 72B, the second left link 73B, and the left wrist part 74B constitute a left arm part 75B. Here, the right hand 76A includes a base body 77A fixed to a lower end part of the right wrist part 74A, and a strip-shaped claw member 78A extending in parallel with the third rotation axis of the right wrist part 74A from the base body 77A. The left hand 76B includes a base body 77B fixed to a lower end part of the left wrist part 74B, and a strip-shaped claw member 78B extending in parallel with the fifth rotation axis of the left wrist part 74B from the base body 77B. The left and right arms are capable of operating independently or collaboratively. Here, the robot 10 has the pair of claw members 78A and 78B in a fork shape, and carries a cultivation bed 83 described later (see FIG. 10).

The robot controller 3 and the robot communication apparatus 42 are accommodated inside the carriage 70. The robot controller 3 completely carries out an automatic control of the operations of the robot body 1, the carriage 70, and the unmanned aerial vehicle 4 by the processor reading and executing a given control program stored in the memory. The robot body 1 (robotic arm) and the robot controller 3 constitute the robot 10.

Figure 8:
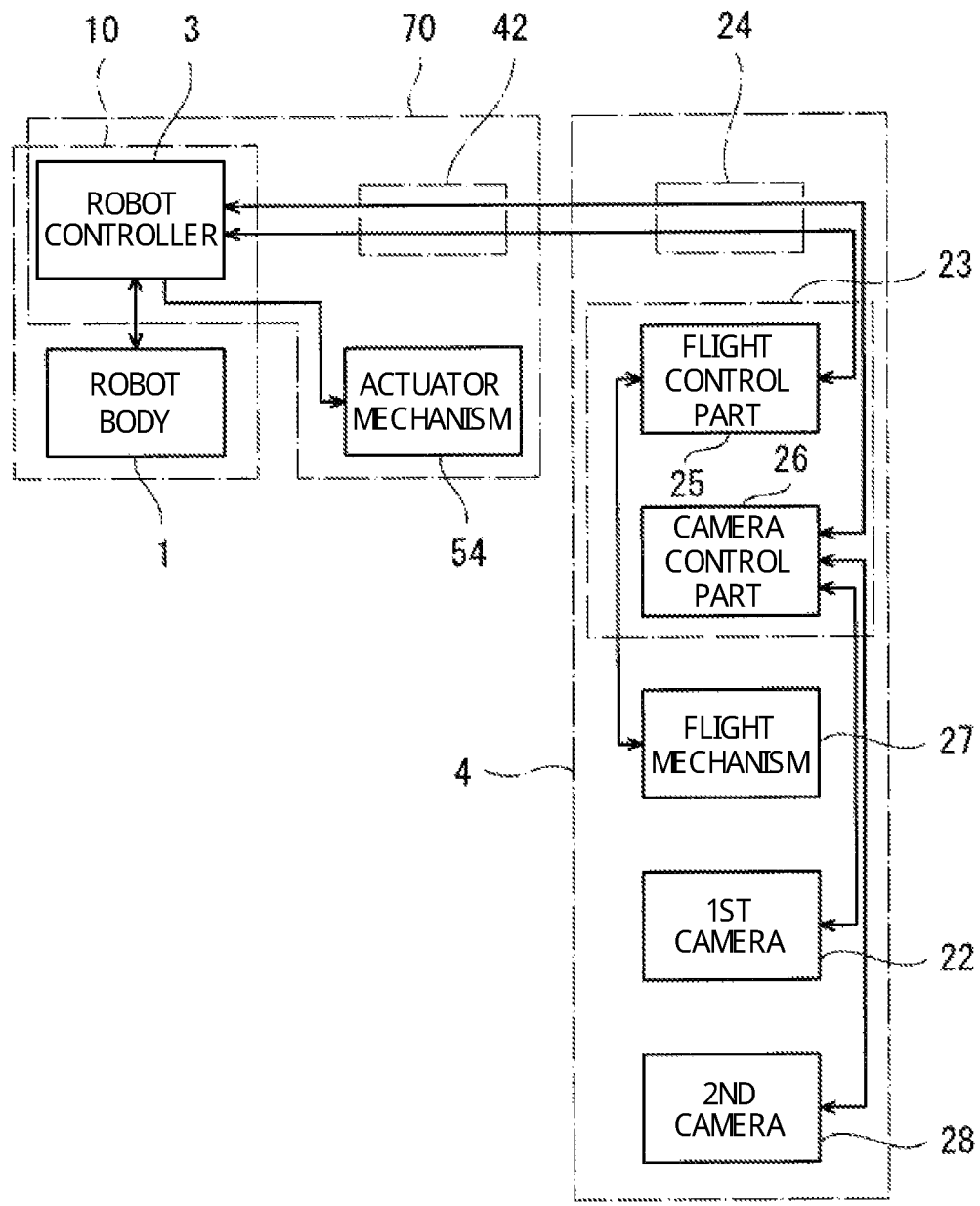
FIG. 8 is a block diagram illustrating one example of a configuration of a control system of the robot system of FIG. 7.

Referring to FIG. 8, the robot controller 3 controls the operation of the actuator mechanism 54 of the carriage 70 and the robot body 1 according to the given control program.

Moreover, the robot controller 3 transmits a flight control signal to the flight control part 25 of the aerial vehicle controller 23 of the unmanned aerial vehicle 4 according to the given control program. The unmanned aerial vehicle 4 has an autonomous mode and an external control mode corresponding to the manipulating mode of Embodiment 1. In the autonomous mode, the flight control part 25 controls the flight mechanism 27 so that the unmanned aerial vehicle 4 performs a given flight according to the given program. Moreover, when a flight control signal is received from the robot controller 3 through the aerial vehicle communication apparatus 24, the flight control part 25 switches the mode to the external control mode, and controls the flight mechanism 27 according to the flight control signal so that the unmanned aerial vehicle 4 performs the flight according to the flight control signal.

The unmanned aerial vehicle 4 includes a first camera 22 and a second camera 28. The first camera 22 is the same as the camera 22 of Embodiment 1. The second camera 28 is configured to be changeable of its posture in two planes perpendicular to each other, and changeable of a direction of the unmanned aerial vehicle 4 within a range of 360° in a horizontal plane (a direction of the optic axis). The second camera 28 has an automatic-focusing function.

The robot controller 3 transmits a camera control signal to the camera control part 26 of the aerial vehicle controller 23 of the unmanned aerial vehicle 4 according to the given control program. The camera control part 26 controls the posture of the first camera 22, and the posture and the direction of the second camera 28 according to the camera control signal. Operation of the first camera 22 and operation of the camera control part 26 related to the first camera 22 are similar to those of Embodiment 1. Note that, here, the camera control part 26 transmits image pick-up data of the first camera 22 to the robot controller 3.

The second camera 28 is, for example, comprised of a three-dimensional camera, and transmits its image pick-up data to the camera control part 26. The camera control part 26 detects a distance between the second camera 28 and a photographic object by carrying out image processing of the image pick-up data. In Embodiment 2, for example, the photographic object has a given shape, or a given identification mark is given to the photographic object, and the camera control part 26 stores the given shape or the given identification mark and detects (extracts) the photographic object from the image pick-up data by determining whether an area which matches with the given shape or the given identification mark exists in the image pick-up data.

For example, the unmanned aerial vehicle 4 is provided with a GPS, and the camera control part 26 detects a spatial position of the unmanned aerial vehicle 4 (accurately, a reference position of the unmanned aerial vehicle 4) based on the positional information of the GPS. Then, the spatial position of the photographic object is detected based on the spatial position of the unmanned aerial vehicle 4, the position of the second camera 28 in the unmanned aerial vehicle 4, the posture and the direction of the second camera 28, and the distance between the second camera 28 and the photographic object. Then, the detected spatial position of the photographic object is transmitted to the robot controller 3. Here, as the photographic objects, at least the robot body 1, the cultivation bed 83 (see FIG. 9) as the work object, and an integrated shelf 82 as an obstacle for the moving robot body 1 are set.

[Application Environment]

Figure 9:
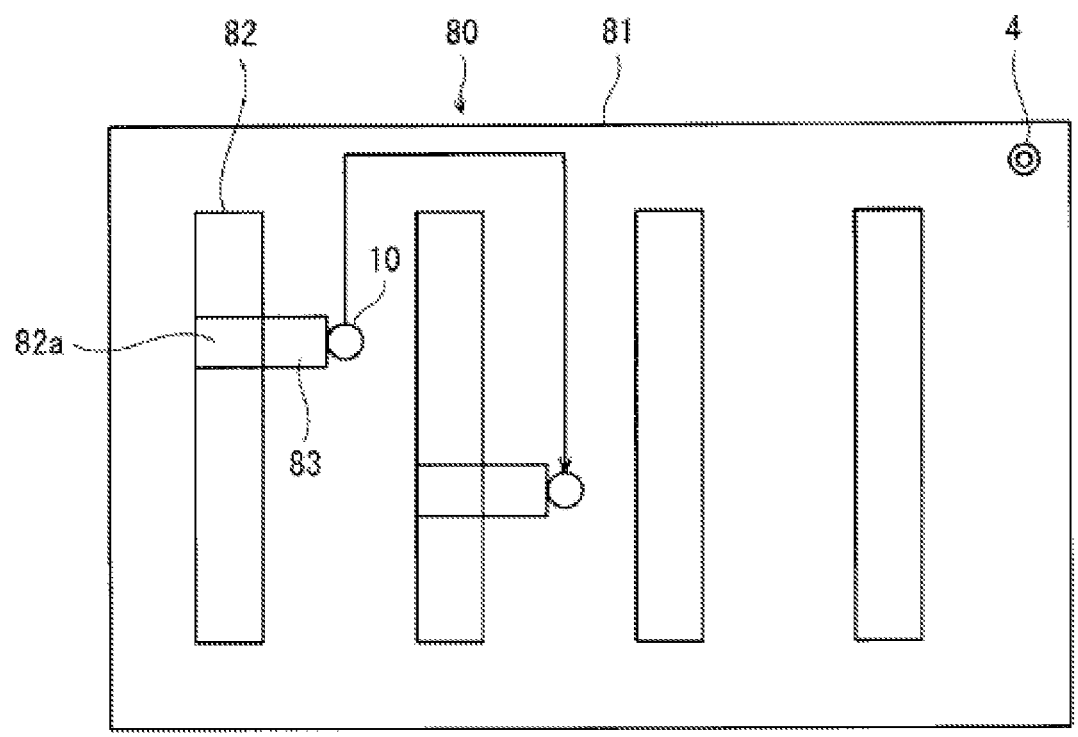
FIG. 9 is a schematic diagram illustrating an applied state of the robot system of FIG. 7.
Figure 10:
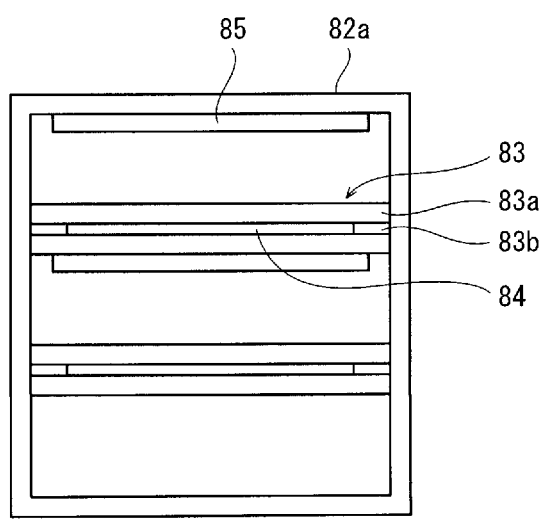
FIG. 10 is a front view schematically illustrating a configuration of a unit shelf of FIG. 9.

FIG. 9 is a schematic diagram illustrating an applied state of the robot system 300 of FIG. 7. FIG. 10 is a front view schematically illustrating a configuration of a unit shelf of FIG. 9.

Referring to FIG. 9, the application object of the robot body 1 of the robot system 300 in Embodiment 2 is an unmanned vegetable growing factory 80. For example, the vegetable growing factory 80 is a complete-closed type. The vegetable growing factory 80 is provided with a factory 81 having a comparatively large interior space with a high ceiling. A plurality of integrated shelves 82 are disposed at an interval with which the robot 10 is able to perform a given work and travel therebetween inside the factory 81. Each integrated shelf 82 is comprised of a given number of unit shelves 82a disposed side by side.

Referring to FIG. 10, for example, the unit shelf 82a is partitioned into three shelf parts, and an upper row and a middle row are used for growing vegetables. A movable cultivation bed 83 is used for growing the vegetables. The cultivation bed 83 is constructed so that a pair of legs 83b are provided to a main body 83a, for example, made of styrene foam. The vegetables are grown on the main body 83a. The pair of claw members 78A and 78B of the robot 10 are inserted into a space 84 between the pair of legs 83b. In each of the upper and middle rows, lighting equipment 85 for emitting given light to the vegetables on the cultivation bed 83, and a device (not illustrated) for supplying nourishing solution to the vegetables on the cultivation bed 83 and discharging the used nourishing solution from the cultivation bed 83 are provided in the ceiling.

A plurality of growth steps of the vegetables are assigned to the plurality of integrated shelves, respectively, and each integrated shelf is maintained at a growth environment according to the assigned growth step. Each cultivation bed 83 is sequentially moved to one of the plurality of integrated shelves to another according to the growth level of the vegetables on the cultivation bed 83.

The robot controller 3 stores the layout of the factory 81 illustrated in FIG. 9, i.e., the size of the interior space of the factory 81, the arrangement and the size of the integrated shelves 82, the arrangement and the size of the unit shelves 82a in each integrated shelf 82, and the arrangement and the size of each shelf row of each unit shelf 82a.

[Operation]

<Basic Operation>

In Embodiment 2, only the unmanned aerial vehicle 4 is provided with the GPS, and the robot 10 does not have the GPS. The reason is as follows. In Embodiment 2, positional error of the GPS is relatively large to the size of the factory 81. If both the unmanned aerial vehicle 4 and the robot 10 identify the positions of the unmanned aerial vehicle 4 and the robot 10 and the integrated shelf 82 etc. based on the positional information of the GPS, the errors of the GPS are added up to cause a trouble in the work of the robot 10. Of course, if the positional error of the GPS is relatively small to the size of the factory 81, both the unmanned aerial vehicle 4 and the robot 10 may be provided with the GPS.

In Embodiment 2, the robot controller 3 changes the direction of the second camera 28 (the direction of the optic axis) 360° in the horizontal plane of the unmanned aerial vehicle 4 at a given cycle and a suitable posture through the camera control part 26, while circling the unmanned aerial vehicle 4 around in the factory 81. In other words, the second camera 28 is rotated in the horizontal plane of the unmanned aerial vehicle 4. Then, as described above, the camera control part 26 performs the image pick-up of a photographic object and the detection of the distance between the second camera 28 and the photographic object to detect the spatial position of the robot body 1 and the spatial position of each integrated shelf (accurately, its reference position) 82 which is the obstacle, and transmits these to the robot controller 3.

<Concrete Operation>

Figure 11:
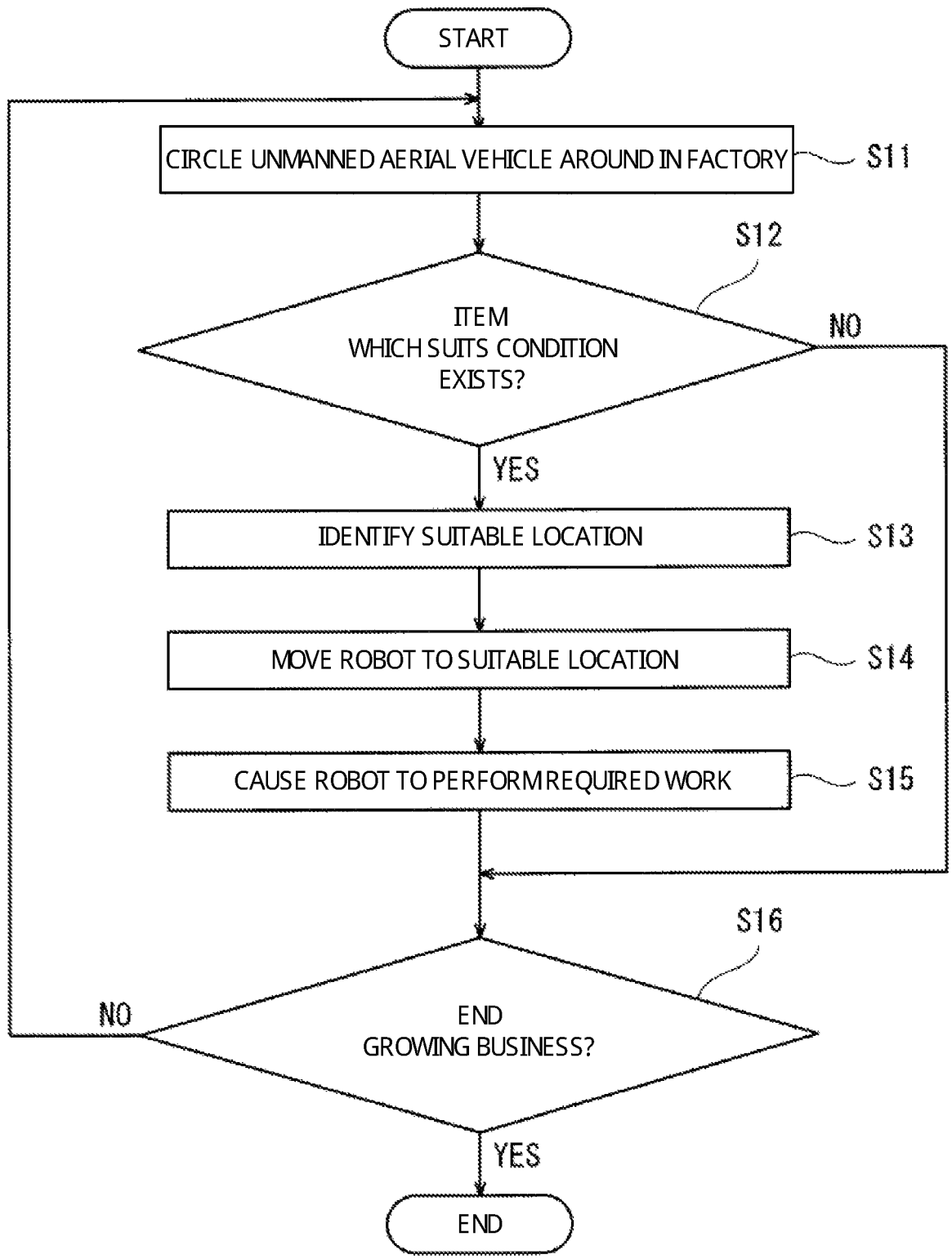
FIG. 11 is a flowchart illustrating operation (how to use) of the robot system of FIG. 7.

FIG. 11 is a flowchart illustrating operation (how to use) of the robot system 300 of FIG. 7. The operation of the robot system 300 is carried out by a control executed by the robot controller 3 of the robot 10.

Referring to FIGS. 9 and 11, the robot controller 3 circles the unmanned aerial vehicle 4 around in the factory 81 (Step S11). In the meantime, as described above, the second camera 28 is rotated, and the spatial position of the robot body 1 and the spatial position of each integrated shelf (accurately, the reference position) 82 which is the obstacle are acquired from the camera control part 26.

Then, the robot controller 3 determines whether an item which suits a condition exists (Step S12). The "item" means a phenomenon for which the robot 10 needs to perform a certain work. Here, for example, it is to change (move) the integrated shelf 82, on which the cultivation bed 83 is placed, according to the growth of the vegetables on the cultivation bed 83. The "condition" means a condition under which the robot 10 performs a certain work. Here, for example, it means a condition under which the integrated shelf 82 on which the cultivation bed 83 is placed is changed according to the growth of the vegetables on the cultivation bed 83. In detail, for example, the robot controller 3 controls the first camera 22 through the camera control part 26 of the unmanned aerial vehicle 4 to cause the first camera 22 to image the vegetables on each cultivation bed 83 of each integrated shelf 82, and monitors the growth of the vegetables on each cultivation bed 83 based on the image pick-up data. In detail, for example, the robot controller 3 carries out image processing of the image pick-up data, and detects a height of the vegetables. On the other hand, the robot controller 3 stores a correlation table in which the plurality of growth steps and the maximum height of the vegetables at each step are associated with each other. The robot controller 3 compares the detected height of the vegetables with the correlation table, and determines whether the height of the vegetables on each cultivation bed 83 exceeds the maximum height of the vegetables corresponding to the growth step assigned to the integrated shelf 82 to which the unit shelf 82a where each cultivation bed 83 is placed belongs.

If "not exceeding," the robot controller 3 determines that "the item which suits the condition does not exist" (NO at Step S12). Then, it determines whether the growing business is to be ended (Step S16), and if not ending the growing business (NO at Step S16), it returns to Step S11. Note that, if ending the growing business (YES at Step S16), this operation of the robot system 300 is ended. In this case, the unmanned aerial vehicle 4 lands at a given position.

On the other hand, if "exceeding," the robot controller 3 determines that "the item which suits the condition exists" (YES at Step S12), and it then transits to Step S13. Below, the cultivation bed 83 corresponding to "the item which suits the condition" is referred to as a "suitable cultivation bed."

At Step S13, the robot controller 3 identifies a suitable location. Here, this "suitable location" is a row of the unit shelf 82a on which the suitable cultivation bed 83 is placed. In detail, the robot controller 3 controls the second camera 28 through the camera control part 26 of the unmanned aerial vehicle 4 so that the second camera 28 takes the same posture and the same direction as the first camera 22. Then, the camera control part 26 operates as described above to detect a spatial position of the suitable cultivation bed, and transmits it to the robot controller 3. In this case, the camera control part 26 stores the shape of the cultivation bed 83, extracts the suitable cultivation bed 83 as the photographic object (work object) by image processing based on the stored shape of the cultivation bed 83, and detects its distance. Then, the spatial position of the suitable cultivation bed 83 is detected as described above by using the distance, and it is transmitted to the robot controller 3. The robot controller 3 identifies the row of the unit shelf 82a on which the suitable cultivation bed 83 is placed based on the spatial position of the suitable cultivation bed 83 and the layout of the factory 81 stored in the robot controller 3, and identifies the spatial position of the suitable cultivation bed 83.

Moreover, the robot controller 3 identifies the integrated shelf 82 to which the growth step corresponding to the height of the vegetables on the suitable cultivation bed 83 is assigned, and identifies the unit shelf 82a which has an empty row in the identified integrated shelf 82. Below, the empty row of the unit shelf 82a is referred to as a "destination row." Then, the robot controller 3 identifies the current position of the robot 10 (carriage 70) based on the spatial position of the robot body 1 transmitted from the camera control part 26 of the unmanned aerial vehicle 4. Then, the robot controller 3 sets a traveling course of the robot 10 (carriage 70) based on the spatial position of each integrated shelf (its reference position) 82 transmitted from the camera control part 26 of the unmanned aerial vehicle 4, and the layout of the factory 81 so that the robot 10 avoids the integrated shelf 82.

Then, the robot controller 3 moves the robot 10 to a suitable location (Step S14). In detail, the robot controller 3 controls the actuator mechanism 54 of the carriage 70 so that the robot 10 moves to the front of the suitable cultivation bed 83 along the traveling course.

Then, the robot controller 3 causes the robot 10 to perform a required work (Step S15). In detail, the robot controller 3 causes the robot body 1 to insert the pair of claw members 78A and 78B into the space 84 between the pair of legs 83b of the suitable cultivation bed 83, and then to slightly raise the pair of claw members 78A and 78B to lift the suitable cultivation bed 83. Then, the robot controller 3 causes the robot body 1 to pull out the suitable cultivation bed 83 from the unit shelf 82a. Then, the robot controller 3 sets the traveling course of the robot 10 (carriage 70) based on the spatial position of each integrated shelf (its reference position) 82 transmitted from the camera control part 26 of the unmanned aerial vehicle 4, and the layout of the factory 81 so that the robot 10 avoids the integrated shelf 82.

Then, the robot controller 3 causes the robot 10 to move to the front of the destination row along the traveling course.

Then, the robot controller 3 causes the robot body 1 to move the suitable cultivation bed 83 to an upper part of the destination row, then to slightly lower the pair of claw members 78A and 78B to place the suitable cultivation bed 83 on the destination row, and then to pull out the pair of claw members 78A and 78B from the space 84 between the pair of legs 83b of the suitable cultivation bed 83. Therefore, the required work of the robot 10 is finished.

Then, the robot controller 3 determines whether the growing business is to be ended (Step S16), and if not ending the growing business (NO at Step S16), it returns to Step S11. If ending the growing business (YES at Step S16), this operation of the robot system 300 is ended.

<Operation and Effects>

According to Embodiment 2, the robot body 1 can be operated automatically. Moreover, since the robot controller 3 identifies the work object of the robot body 1 (suitable cultivation bed 83) by using the unmanned aerial vehicle 4, it can monitor the large range by using the unmanned aerial vehicle 4. Thus, the work object of the robot body 1 can be identified easily.

Moreover, since the robot body 1 is configured to be travelable, the unmanned aerial vehicle 4 is configured to acquire the positional information of the work object of the robot body 1 (suitable cultivation bed 83) and transmit it to the robot controller 3, and the robot controller 3 is configured, when it receives the positional information of the work object, to cause the robot body 1 to travel to the work object position based on the position of the robot body 1 and the positional information of the work object, it can cause the robot body 1 to automatically travel to the work object position.

Moreover, since the unmanned aerial vehicle 4 is configured to further acquire the positional information of the obstacle (integrated shelf 82) which exists in the course from the robot body 1 to the work object, and transmit it to the robot controller 3, and the robot controller 3 is configured to cause the robot body 1 to avoid the obstacle and travel to the work object position based on the received positional information of the obstacle, it can automatically cause the robot body 1 to avoid the obstacle which exists in the course from the robot body 1 to the work object, and to travel to the work object position.

Other Embodiments

In Embodiment 1 and its modification, the robot body 1 is not limited to the articulated robotic arm. The robot body 1 may be a parallel link type robot, an orthogonal type robot, or a robot of other types.

In Embodiment 1 and its modification, the work of the robot body 1 may be not paint but assembly of the hull of the ship 31. In this case, a crane which is suitable for the assembly of the hull of the ship 31 is used as the moving devices 32 and 33.

In Embodiment 1 and its modification, the application object of the robot body 1 may be a vehicle, an airplane, a bridge, or a building.

From the above description, it is apparent for a person skilled in the art that many improvements and other embodiments of the present disclosure are possible. Therefore, the above description is to be interpreted only as illustration, and it is provided in order to teach a person skilled in the art the best mode that implements the present disclosure. The details of the structures and/or the functions may be altered substantially, without departing from the spirit of the present disclosure.

INDUSTRIAL AVAILABILITY

The robot system and the method of manufacturing the object by using the robot system of the present disclosure are useful, for example, as a robot system and a method of manufacturing an object by using the robot system which can address at least one of the robot application object in which there are many work objects located at the dead angles of the surveillance camera, and a robot application object in which it is necessary to move the robot near each work object.

DESCRIPTION OF REFERENCE CHARACTERS

1 Robot Body
2 Robot Operation Terminal
3 Robot Controller
4 Unmanned Aerial Vehicle
5 Monitor (Display Unit)
6 Aerial Vehicle Operation Terminal
7 Moving Device Operation Terminal
8 Operation Communication Apparatus
9 Operator
10 Robot
11 Robotic Arm
18 Robot Control Part
19 Monitor Control Part
20 Rotor
21 Main Body
22 Camera (First Camera)
23 Aerial Vehicle Controller
24 Aerial Vehicle Communication Apparatus
25 Flight Control Part
26 Camera Control Part
27 Flight Mechanism
28 Second Camera
29 Operation Desk
31 Ship
31a Side Surface
32 Moving Device
33 Moving Device
41 Hand
42 Robot Communication Apparatus
54 Actuator Mechanism
55 Movement Controller
56 Moving Device Communication Apparatus
70 Carriage
80 Vegetable Growing Factory
81 Factory
82 Integrated Shelf
82a Unit Shelf
83 Cultivation Bed
100, 200, 300 Robot System

The invention claimed is:

1. A method of manufacturing an object by using a robot system, the robot system including a robot having a robot body and a robot controller configured to control operation of the robot body, an unmanned aerial vehicle capable of autonomous flight, a robot operation terminal for an operator to operate the robot body, and a monitor configured to present the operator an image of a work of the robot body, the method comprising the steps of:

acquiring image pick-up data of the work of the robot body to the object and transmitting the image pick-up data to the robot controller, by the unmanned aerial vehicle;

receiving the image pick-up data and controlling the operation of the robot body by using the image pick-up data, by the robot controller;

acquiring the image pick-up data of the work of the robot body, and transmitting the image pick-up data to the robot controller, by the unmanned aerial vehicle; and receiving the image pick-up data by the robot controller, displaying the image of the work of the robot body on the monitor based on the image pick-up data, and controlling the operation of the robot body according to the operation of the robot operation terminal by the operator.

2. The method of claim 1, wherein the robot system further includes an aerial vehicle operation terminal for the operator to operate the unmanned aerial vehicle, and
wherein the unmanned aerial vehicle acquires the image pick-up data of the work of the robot body according to the operation of the aerial vehicle operation terminal by the operator, and transmits the image pick-up data to the robot controller.

3. The method of claim 1, wherein the robot body is an industrial articulated robotic arm, and the object is any of a ship, a vehicle, an airplane, a bridge, and a building.

4. A robot system, comprising:
a robot having a robot body and a robot controller configured to control operation of the robot body;
an unmanned aerial vehicle capable of autonomous flight;
a robot operation terminal for an operator to operate the robot body; and
a monitor configured to present the operator an image of a work of the robot body;
wherein the unmanned aerial vehicle acquires at least one of image pick-up data of the work of the robot body and positional information of a work object of the robot body, and transmits at least one of the image pick-up data and the positional information to the robot controller,
wherein the robot controller receives at least one of the image pick-up data and the positional information of the work object, and controls the operation of the robot body by using at least one of the image pick-up data and the positional information of the work object,
wherein the unmanned aerial vehicle acquires the image pick-up data of the work of the robot body, and transmits the image pick-up data to the robot controller, and
wherein the robot controller receives the image pick-up data, displays the image of the work of the robot body on the monitor based on the image pick-up data, and controls the operation of the robot body according to the operation of the robot operation terminal by the operator.

5. The robot system of claim 4, further comprising:
an aerial vehicle operation terminal for the operator to operate the unmanned aerial vehicle,
wherein the unmanned aerial vehicle acquires the image pick-up data of the work of the robot body according to the operation of the aerial vehicle operation terminal by the operator, and transmits the image pick-up data to the robot controller.

6. The robot system of claim 5, wherein the unmanned aerial vehicle includes:
a camera configured to image the work of the robot body;
an aerial vehicle transmitter/receiver configured to transmit the image pick-up data from the camera to the robot controller; and
an aerial vehicle controller configured to control flight of the unmanned aerial vehicle and operation of the camera according to the operation of the aerial vehicle operation terminal by the operator,
wherein the robot includes a robot transmitter/receiver configured to receive the image pick-up data transmitted from the aerial vehicle transmitter/receiver.

7. The robot system of claim 6, further comprising:
a moving device to which the robot body is attached; and
a moving device operation terminal for the operator to operate the moving device,
wherein the moving device moves the robot body in a vertical direction and a horizontal direction.

8. The robot system of claim 7, wherein the moving device is travelable,
wherein the moving device operation terminal is operable of robot movement operation and traveling of the moving device, and
wherein the robot controller controls the traveling of the moving device according to an operation of the moving device operation terminal related to the traveling of the moving device by the operator.

9. The robot system of claim 4, wherein the robot controller controls the operation of the robot body according to a given control program.

10. The robot system of claim 9, wherein the robot controller identifies the work object of the robot body by using the unmanned aerial vehicle.

11. The robot system of claim 10, wherein the robot is travelable,
wherein the unmanned aerial vehicle acquires the positional information of the identified work object of the robot body, and transmits the positional information to the robot controller, and
wherein when the positional information of the work object is received, the robot controller causes the robot to travel to the work object position based on the position of the robot body and the positional information of the work object.

12. The robot system of claim 11, wherein the unmanned aerial vehicle acquires the positional information of the robot body, and transmits the positional information to the robot controller, and
wherein the robot controller causes the robot to travel to the work object position based on the received position of the robot body and the positional information of the work object.

13. The robot system of claim 10, wherein the unmanned aerial vehicle further acquires positional information of an obstacle existing in a course from the robot body to the work object, and transmits the positional information to the robot controller, and
wherein the robot controller causes the robot to travel to the work object position while avoiding the obstacle, based on the received positional information of the obstacle.

14. The robot system of claim 4, wherein the robot body is an industrial articulated robotic arm.

15. A robot system, comprising:
a robot having a robot body and a robot controller configured to control operation of the robot body; and
an unmanned aerial vehicle capable of autonomous flight,
wherein the unmanned aerial vehicle acquires at least one of image pick-up data of a work of the robot body and positional information of a work object of the robot body, and transmits at least one of the image pick-up data and the positional information to the robot controller,
wherein the robot controller receives at least one of the image pick-up data and the positional information of the work object, and controls the operation of the robot body by using at least one of the image pick-up data and the positional information of the work object,
wherein the robot controller controls the operation of the robot body according to a given control program, wherein the robot controller identifies the work object of the robot body by using the unmanned aerial vehicle, wherein the unmanned aerial vehicle acquires the positional information of the identified work object of the robot body, and transmits the positional information to the robot controller, wherein when the positional information of the work object is received, the robot controller causes the robot to travel to the work object position based on the position of the robot body and the positional information of the work object, and wherein an actuator mechanism is configured to cause the robot to travel in its entirety to the work object position.

* * * * *